Jan. 21, 1958 J. A. DOLESH ET AL 2,820,370
ROTARY SOLENOID MECHANISM
Filed June 4, 1953 2 Sheets-Sheet 1

INVENTOR.
James A. Dolesh
& Edward J. Mastney
By: Robert L. Kahn

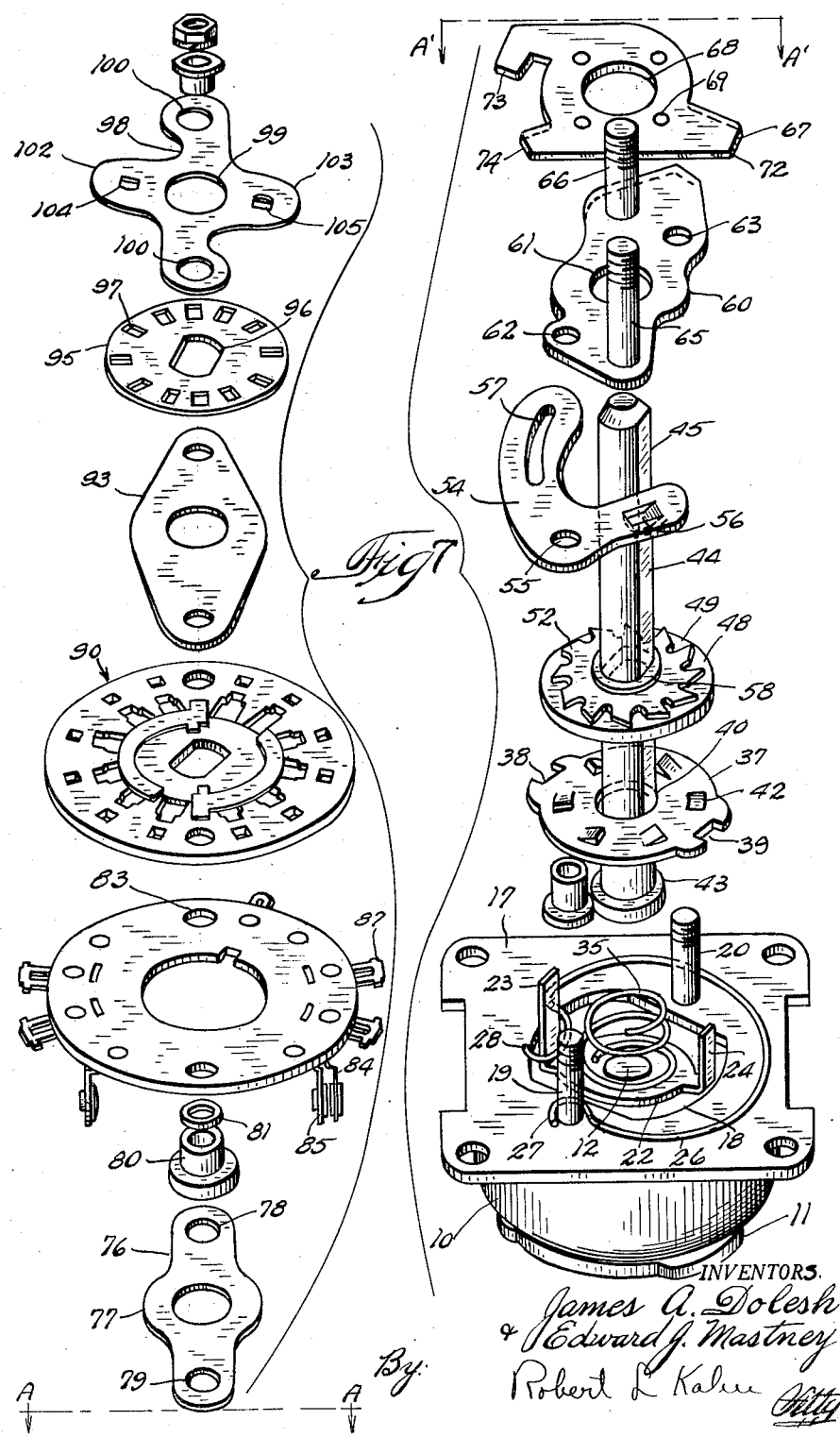

2,820,370

ROTARY SOLENOID MECHANISM

James A. Dolesh, Chicago, and Edward J. Mastney, Berwyn, Ill., assignors to Oak Mfg. Co.

Application June 4, 1953, Serial No. 359,502

3 Claims. (Cl. 74—126)

This invention relates to a rotary solenoid mechanism and particularly to a mechanism for preventing overshoot of a load for a rotary solenoid. While the invention forming the subject matter of this application is adapted for use with various kinds and types of rotary solenoids, it is particularly adapted for use with the rotary solenoid described in United States Patent 2,430,940 issued November 18, 1947, to George H. Leland.

In the rotary solenoid disclosed in the above identified patent, an armature is moved through to predetermined angular range by the force created on the armature, incident to the generation of a magnetic field. The mechanism is so designed that the armature in turning also moves axially so that a point on the armature describes the arc of a helix. Such a rotary solenoid has found many applications, particularly in connection with the operation of rotary switches and other mechanism requiring a limited rotary motion.

The characteristics of solenoids are such that the torque exerted by the armature increases with displacement from normal rest position, the maximum torque generally being present at the end of the power stroke. Where a load having substantial inertia is present, it happens that the increasing acceleration of the armature during the power stroke may result in imparting so much momentum to the load as to cause the load to overshoot when the solenoid has reached the end of its stroke. This invention provides a construction whereby a rotary solenoid will transmit power through pawl and ratchet means making it impossible for the load to travel beyond the limits assigned to the load for one operating cycle of the solenoid. While the invention will be disclosed and described in connection with a construction whereby the power stroke of the solenoid directly operates the load, a spring return being provided for the purpose of reset of certain parts of the mechanism, it is understood that the same construction may be applied to a rotary solenoid wherein the solenoid itself merely feeds power to a spring and the spring itself operating the load. The new construction is particularly useful where the operating voltage for the solenoid may vary widely thus varying the solenoid action.

In order that the invention may be understood, reference will now be made to the drawings, wherein an exemplary embodiment illustrative of the invention is shown, it being understood that variations in construction may be made without departing from the scope of the invention, except as defined by the appended claims. Referring therefore to the drawing:

Figure 7 is an exploded view of the various parts making up the construction shown in Figure 1, the exploded part continuing with line A—A being superimposed upon line A'—A' to make a single exploded view of the various parts.

Figure 2:
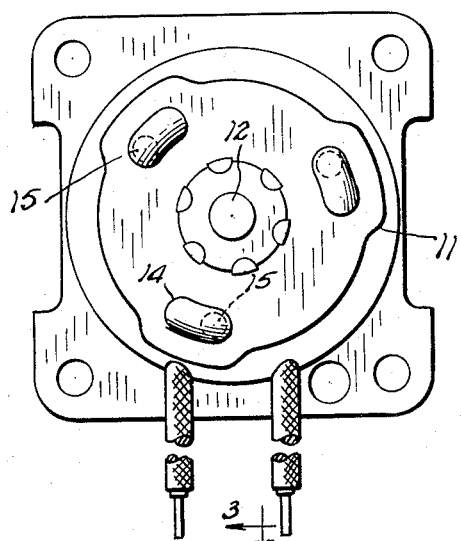
Figure 2 is a view from the rotary solenoid end of the assembly, this end being referred to, for convenience, as the rear end.
Figure 3:
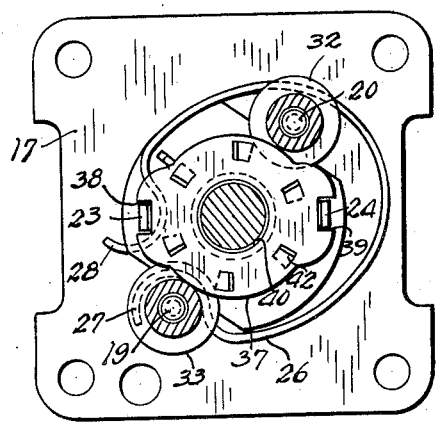
Figure 3 is a view along line 3—3 of Figure 1.
Figure 1:
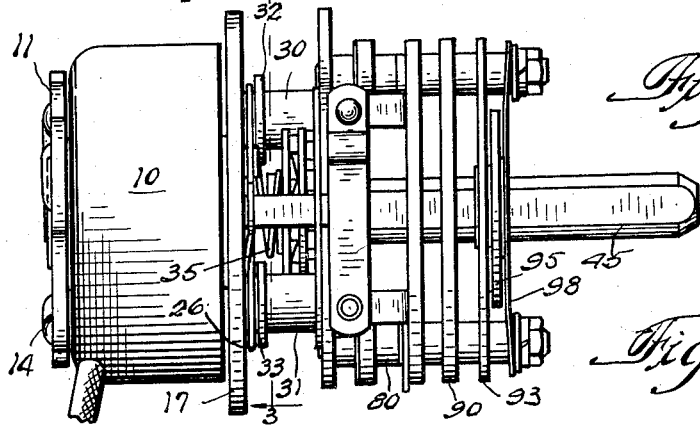
Figure 1 is a side view of a rotary solenoid and mechanism embodying the present invention together with a rotary switch as a load, the mechanism being in a normal quiescent position.
Figure 5:
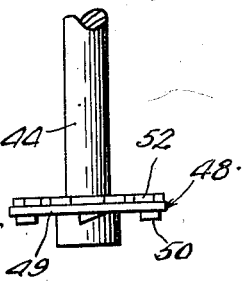
Figures 5 and 6 are details of the ratchet assembly.

Any rotary solenoid may be used in connection with the present invention, the only requirement being that the rotary solenoid have a predetermined fixed angle of rotary movement. As illustrated, rotary solenoid generally indicated by numeral 10 has rotary plate 11 secured on shaft 12 extending through the rotary solenoid. The rotary solenoid illustrated here is more fully disclosed in the United States patent previously identified. Rotary plate 11 has a number, here shown as three, of arcuate recesses generally indicated by numeral 14, these recesses varying in depth along the length of the recess in one direction. Suitable ballbearings 15 operate in these recesses, these ballbearings cooperating with some recesses in the fixed portion of the solenoid. As shown in Figure 2, rotary plate 11 will turn in a clockwise direction during a power stroke, the travel being limited to a particular angle, suitable means being provided to return the rotary plate and shaft to a starting position when the solenoid is deenergized. As is more fully disclosed in the patent, rotary plate 11, on its power stroke, moves toward casing 10, this forward movement causing shaft 12 not only to turn but also to be moved lengthwise a limited distance.

Solenoid 10 carries at the front end thereof mounting plate 17, this plate having suitable opening 18 and carrying studs 19 and 20. Within opening 18, the end of shaft 12 carries coupling plate 22, provided with upturned fingers 23 and 24. Finger 23 is longer than 24 and the two fingers are disposed at diametrically opposed points on the coupling plate.

Figure 6:
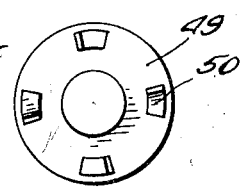
Figure 4:
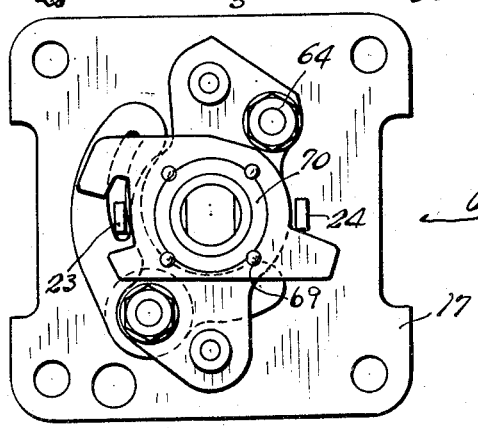
Figure 4 is an end view from the load shaft, the switching load being omitted.

Resting on plate 17 is wire spring 26 having end 27 curled around stud 19, the other end of the spring having end 28 curled around finger 23. As seen in Figure 6, coupling plate 22 will be turned in an anti-clockwise direction upon a power stroke of the armature and this will cause finger 23 to pull on wire spring 26.

Disposed over studs 19 and 20 are sleeves 30 and 31, each of these sleeves having annular ribs 32 and 33. Ribs 32 and 33 are spaced a sufficient distance from the sleeve ends so that when the sleeves are disposed over the studs, curved end 27 of the spring and the body of spring 26 will be able to rest against the outside of the sleeve without binding. It is understood that sleeves 30 and 31 do not cover the full length of studs 19 and 20 but leave threaded bolt portions exposed.

Resting upon coupling plate 22 is tapered helical coil spring 35, this spring being provided for the purpose of taking up the axial movement of the solenoid shaft during operation.

Floating upon coil spring 35 is driving ratchet disc 37, this consisting of a generally circular disc having notched sides 38 and 39 designed to accommodate fingers 23 and 24 of the coupling plate. Driving ratchet 37 has aperture 40 centrally disposed for clearing a shaft to be identified later. Driving ratchet disc 37 has on the upper face thereof a series of ratchet teeth 42, these teeth being spaced at regular intervals around the central clearance opening 40 of the disc. The ratchet teeth are so shaped that in the construction illustrated, the teeth have the engaging front surfaces there for coupling in the direction of rotation of the ratchet disc when the rotary solenoid is moving in response to energization of the solenoid winding. Passing through aperture 40 of ratchet disc 37 is bottom end 43 of shaft 44. Shaft 44 has at least one portion 45 flattened so that members, having correspondingly-shaped noncircular openings, may be rotatively locked to the shaft.

Ratchet assembly 48 is disposed around shaft 44 and rotatively locked thereto. Assembly 48 consists of disc portion 49 having driven ratchet teeth 50 on the bottom face thereof and ratchet gear teeth 52 on the top thereof. The assembly may be conveniently formed by having a disc, stamped to provide ratchet gear teeth 52, riveted or permanently attached to disc 49, the latter having the ratchet teeth 50 suitably formed thereon. It is preferred to have ratchet assembly 48 permanently attached to shaft 44 so that the ratchet assembly not only rotates with the shaft but is also rigidly secured thereto against movement along the shaft axis.

Above ratchet gear teeth 52 is pawl 54 having pivot aperture 55, pawl lug 56 and cam slot 57. Pawl 54 is mounted on stud 19 above the corresponding sleeve, aperture 55 being disposed over the stud. Finger 23 is threaded into slot 57 while pawl lug 56, upon oscillation of the escapement cam, will be moved into and out of the path of ratchet gear teeth 52.

Above ratchet gear disc 52 is washer 58, of substantially the same thickness as pawl 54, and support plate 60. Support plate 60 has opening 61 for clearing shaft 44. Support plate 60 also has apertures 62 and 63 to register with the threaded ends of studs 19 and 20. Suitable nuts 64 are provided for locking support plate 60 in position. Support plate 60 also carries switch supporting studs 65 and 66, these studs being attached to the support plate and extending upwardly therefrom. Support plate 60 is rigidly secured with respect to the solenoid and the plate will clear shaft 44 so that the shaft may turn freely. Above support plate 60 is contact-moving plate 67 having aperture 68 for registering with aperture 61, this aperture 68 also clearing shaft 44. Eyelet 70 is provided for attaching contact-moving plate 67 to switch-supporting plate 60 and maintaining the two in registering positions while permitting contact-moving plate 67 to rotate with respect to support plate 60.

Rivets 69 are provided on contact moving plate 67 to provide raised friction reducing points.

Contact-moving plate 67 has finger 72 at one end and spaced fingers 73 and 74 at the other end thereof, the two spaced fingers 73 and 74 forming a lost motion means. Contact-moving plate 67 is mounted above supporting plate 60 so that spaced fingers 73 and 74 are disposed on opposite sides of finger 23 of the coupling plate.

Disposed above contact-moving plate 67 is spring strap 76 having aperture 77 for clearing shaft 44 and having apertures 78 and 79 through which studs 65 and 66 may pass. Disposed on studs 65 and 66 above spring strap 76 are sleeves 80 and washers 81 for supporting the stationary part of the load on studs 65 and 66. As shown here, the load includes a rotary switch assembly. Threaded on studs 65 and 66 is insulating disc 83 carrying, at diametrically opposed points, movable contacts 84 cooperating with fixed contacts 85. The movable contacts are so arranged that finger portions 67 and 73 of the contact-moving plate 67 will open, or close as the case may be, movable contacts 84, when the solenoid has moved to a predetermined part of its operating range. In practice, the movable contacts will be opened when the rotary solenoid has reached or is approaching the end of its travel, the movable contacts opening the circuit for the rotary solenoid so that the rotary solenoid may return to normal position. Suitable spring clips 87 are carried by insulating disc 83, the spring clips being connected to the fixed and movable contacts to connect the same to desired circuit components.

Disposed in spaced relation to insulating disc 83 is one or more rotary switch sections generally indicated by numeral 90, these switch sections being well known and being available in a variety of forms. An example of a switch section which may be used is disclosed and claimed in Patent 2,186,943 issued on January 16, 1940. As many switch sections as desired may be used, adjacent parallel switch sections being separated by suitable spacer sleeves over studs 65 and 66. It is understood that the rotor of a switch section is usually provided with a noncircular aperture for rotatively engaging shaft 44 while permitting the rotor of the switch section to float with respect to the stator. Disposed above the rotor of the last switch section, if more than one switch section is provided, is strap 93 having apertures for clearing shaft 44 and for threading over studs 65 and 66. Strap 93 is of smooth metal and separates the rotor switch sections from a ratchet mechanism. Disposed above strap 93 is ratchet plate 95 having aperture 96 shaped to rotatively lock plate 95 to shaft 44. Ratchet plate 95 has ratchet teeth 97 disposed around the peripheral portion thereof. Above ratchet plate 95 is spring member 98 having aperture 99 for clearing shaft 44 and having apertured portions 100 for threading over studs 65 and 66. Transversely to the line of support of ratchet plate 98 are wing portions 102 and 103 having ratchet teeth 104 and 105, respectively. These teeth are arranged to cooperate with ratchet teeth 97 on the plate. Suitable spacer sleeves and nuts are provided for engaging the threaded ends of studs 65 and 66 to bolt the various parts together.

In the construction shown, and merely by way of example, the rotary solenoid may have an angular range of travel of something more than 30 degrees, as for example 35 degrees. Ratchet plate 37 has six teeth uniformly spaced, thus providing a 60 degree angle between adjacent teeth. The following ratchet teeth 50 on the bottom of ratchet assembly 48 are four in number so that a 30 degree ratchet advance is obtained. The extra travel of the rotary solenoid is provided for insuring clearance of the ratchet. Ratchet gear teeth 52 are twelve in number, spaced 30 degrees apart. Pawl 54 has the cam slot so shaped that elongated finger 23 will move the pawl from a normal position where lug 56 clears the ratchet gear teeth to a position where lug 56 engages a ratchet gear tooth when the rotary solenoid has reached the end of its power stroke. Contact-operating plate 67 is proportioned so that finger 23, which is long enough to reach through slot 57 and into the region between fingers 73 and 74, will operate the contact-moving fingers to open and close the spring contacts. The rotary switch section is so designed that a 30 degree movement of the rotor will suffice to change the switch section from one position to another. The index means consisting of ratchet plate 95 and the ratchet teeth 104 and 105 cooperate to permit switch movement of 30 degrees.

When the rotary solenoid reaches the end of its power stroke, pawl 54 engages the ratchet gear teeth and prevents shaft 44 from overshooting in the direction of solenoid travel. By proper adjustment of the timing when contacts 84 and 85 will open with respect to the ends of the stroke of the rotary solenoid, it is possible to utilize the inertia of the load to complete the last bit of travel of the rotary solenoid, after which the rotary solenoid freely returns to normal position. The load will only move through a predetermined angle and will remain in set position until the next power stroke. It is understood that the angular ranges given above are merely exemplary and that, in practice, any desired angles may be obtained, this depending upon the design of the rotary solenoid, the design of the various ratchets and the nature of the load. It is also possible to have loads other than rotary switches.

It will be noted that the work is done by the rotary solenoid during its power stroke and that the spring return of the rotary solenoid performs no work upon the load. It is possible, however, to reverse the ratchet means so that the power stroke of the rotary solenoid stores energy in a spring after which the spring operates to move a load through a predetermined range.

The ratchets for driving the load in one direction and preventing reverse movement of the load may be replaced by any other one way drive means. A one-way drive is disposed between the rotary solenoid or other motor means and the load. A one-way holding means is disposed between the load and any fixed point. The two one-way means are in opposed relation so that when the one-way drive is in coupling condition, the one-way holding means slips.

The holding means connected between the shaft and some fixed point may be omitted where the load has sufficient friction so that reverse shaft movement is not possible. It is also possible to substitute conventional index means for the one-way holding means. Such index means provide sufficient friction so that reverse shaft movement is practically eliminated.

What is claimed is:

1. In combination, an electric motor of the type having an armature movable over a limited angular travel range, said armature having means to bias the same to the starting end of its travel range from which position said armature moves toward the other end of its range upon motor energization, a load adapted to be stepped by said motor, and anti-overshoot means connecting said load and armature, said anti-overshoot means comprising the following: a coupling plate rigidly attached to said armature, said plate having fingers extending in a direction parallel to the axis around which said armature moves, a driving ratchet plate disposed in parallel relation to said coupling plate, said ratchet plate having two notches in the edge for accommodating the coupling plate fingers, said ratchet plate having ratchet teeth formed in its body disposed in a circular pattern, a shaft coaxial with but separate from the armature, a ratchet assembly rigidly coupled to said shaft, said ratchet assembly having a disc with driven ratchet teeth on the side and ratchet gear teeth on the other side disposed in a circular pattern, means for urging said ratchet plate against said ratchet disc, said ratchet disc having the driven teeth cooperating with the teeth on said ratchet plate, a bell crank type of pawl cam movable about a stationary pivot eccentric of said shaft, said cam having a pawl lug cooperating with said ratchet gear teeth, said pawl cam also having a slotted arm for receiving a finger from the coupling plate, said pawl cam being adapted to have said one finger from the coupling plate, in the normal position of the armature, maintain said pawl cam so that the lug is normally clear of said ratchet gear teeth but on energization of said motor, said finger moves said pawl cam so that the pawl lug engages a ratchet gear tooth, the motor having a range of angular travel which is greater than the permissible travel of said anti-overshoot means.

2. The consruction according to claim 1 wherein said coupling plate and said ratchet plate have a coil spring between them for urging said ratchet plate against said ratchet disc.

3. In combination, an electric motor of the type having an armature movable over a limited angular travel range, said armature having means to bias the same to a starting position at one end of its travel range from which position said armature moves toward the other end of its range upon motor energization, a load adapted to be stepped by said motor, and anti-overshoot means connecting said load and armature, said anti-overshoot means comprising the following: a coupling plate attached to said armature and movable about an axis, said plate having fingers extending parallel to said axis, a pair of rotary members in parallel planes concentric with said axis and having means to provide a driving connection between said two members when one member is turned in one direction only, said other member slipping when said one member is turned in the reverse direction, a ratchet gear carried by said other member, a bell crank eccentric of said axis, said bell crank having one arm provided with a detent claw for cooperating with said ratchet gear, said bell crank having the other arm slotted, means for coupling said two fingers of said driving plate to said one member so that said one member will move with said armature, one of said two fingers extending far enough and engaging the slotted arm of said bell crank, said bell crank normally being free of said ratchet gear when the armature is at said one end of its travel range, said bell crank engaging said ratchet gear to lock the same against rotation when said armature has moved said coupling plate and finger upon motor energization, said bell crank and ratchet gear when locked preventing movement of said other member and a load coupled to said ratchet gear.

References Cited in the file of this patent

UNITED STATES PATENTS

| | | |
|---|---|---|
| 1,165,092 | Grunow | Dec. 21, 1915 |
| 1,377,559 | Cassel | May 10, 1921 |
| 2,430,940 | Leland | Nov. 18, 1947 |